July 11, 1933. A. P. BEARDSLEY 1,918,080
APPARATUS FOR USE IN THE CATALYTIC OXIDATION OF GASES
Filed Nov. 21, 1930
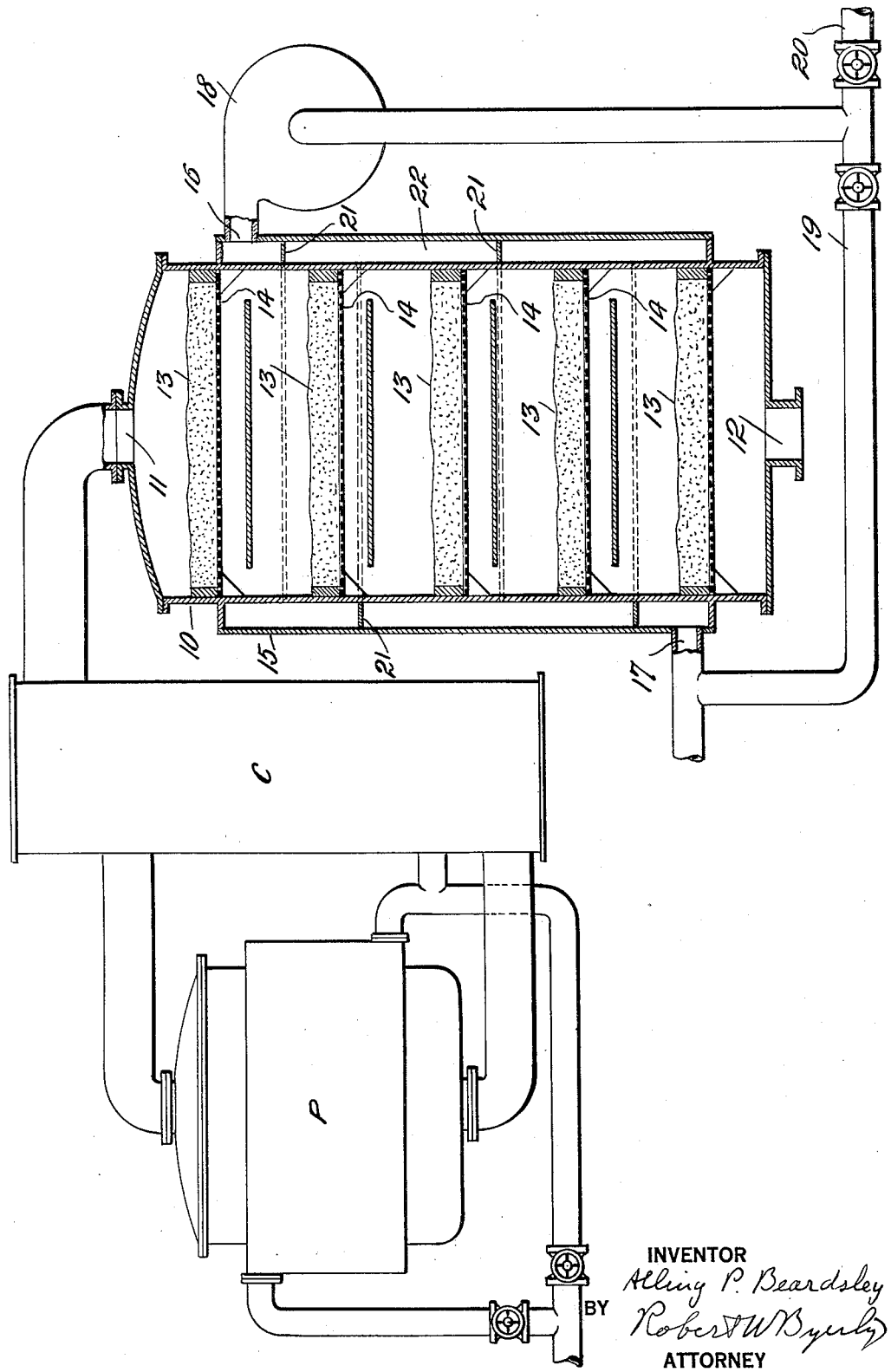
INVENTOR
Alling P. Beardsley
BY Robert W Byerly
ATTORNEY Patented July 11, 1933

1,918,080

UNITED STATES PATENT OFFICE

ALLING P. BEARDSLEY, OF PLAINFIELD, NEW JERSEY, ASSIGNOR TO THE CALCO CHEMICAL COMPANY, INC., OF BOUND BROOK, NEW JERSEY, A CORPORATION OF DELAWARE

APPARATUS FOR USE IN THE CATALYTIC OXIDATION OF GASES

Application filed November 21, 1930 Serial No. 497,102.

This invention relates to apparatus for use in the catalytic oxidation of gases, and aims particularly to provide improved converter apparatus for use in the contact method of making sulphuric acid.

In the catalytic oxidation of sulphur dioxide to sulphur trioxide, the velocity of the reaction increases rapidly with increase of temperature, while, on the other hand, the percentage of conversion at equilibrium decreases with increase of temperature. In order to obtain both rapid and substantially complete conversion, it is desirable that the stream of gases be passed through the catalytic mass at a diminishing temperature, which on early contact of the gases with the catalytic mass is high enough to cause a rapid conversion, and on later contact with the catalytic mass is low enough to cause a high percentage of conversion. Since the reaction creates heat, maintaining such a temperature gradient in the stream of gases passing through the catalytic mass requires the withdrawal of heat from the gas stream at progressively diminishing rates during the progress of the stream through the catalytic mass. To attain ideal conditions, the rate of the withdrawal of heat from the stream should be a diminishing logarithmic function of the flow of the gases through the catalytic mass.

The present invention provides a simple converter of the tray type in which this ideal condition may be approximated in practice. In order to illustrate the invention, I will describe in detail a specific embodiment of it which is shown in the accompanying drawing. The drawing shows in vertical section a converter 10 embodying the invention, and indicates diagrammatically another converter and a heat exchanger through which the gases may be passed before entering the converter 10.

The converter 10 shown in the drawing consists of a cylindrical casing through which the gases to be converted flow from an inlet opening 11 at one end of the converter to an outlet opening 12 at its other end. A series of separated catalytic masses 13 are supported on foraminous trays or screens 14 in the converter 10 in such manner that the gases pass through all the masses in series.

Between its ends, the converter 10 is surrounded by a cooling jacket 15. To provide for the flow of cooling medium through the converter in the same general direction as that in which the gases to be converted flow through the converter, the cooling jacket is provided with an inlet opening 16 near the end of the jacket which is nearest the converter inlet opening 11, and with an outlet opening 17 near the end of the jacket which is nearest the converter outlet opening 12. To avoid circumlocution, I shall refer to the location of the jacket inlet opening 16 as "at the inlet end of the converter" and to the jacket outlet opening 17 as "at the outlet end of the converter", which expressions should be understood not to imply that the jacket is necessarily of the same length as the converter nor that the jacket inlet and outlet openings are immediately adjacent to its corresponding opening in the converter.

Means are provided for circulating a cooling medium through the cooling jacket from its inlet opening 16 to its outlet opening 17. In the form shown, such means include a blower 18 having its discharge connected to the inlet opening 16. Partial recirculation of the cooling medium is made possible by connecting the inlet of the blower with valve-controlled branches 19, 20, leading respectively from the outlet opening 17 and from a supply of cooling medium. The cooling medium used may be air, or may be gases to be converted, if the latter are supplied at a comparatively low temperature.

The cooling jacket 15 is divided into a number of separate annular chambers by partitions 21, each containing a restricted opening 22 to permit the cooling gas to pass through all the separate annular chambers in series. The partitions make it possible to secure a generally downward flow of the cooling gas through the jacket, notwithstanding the fact that the temperature of the cooling gas increases toward the bottom of the jacket so that thermostatic forces tend to create an upward flow. The openings 22 in successive partitions are located at diametrically opposite points to cause a zig-zag flow of the cooling medium, bringing it into intimate contact with the wall of the converter in each annular chamber.

The drawing illustrates the use of the converter 10 as a secondary converter. In such use, the gases to be converted, such as sulphur dioxide and oxygen, are partially converted and partially cooled by passing them through a primary converter P and a cooler C and are then passed through the converter from its inlet opening 11 to its outlet opening 12. As the gases pass through each mass 13 of catalytic material, further conversion takes place. The conversion occurring in each catalytic mass generates heat, but the heat generated in each mass is less than that generated in the preceding mass. The cooling medium flowing through the annular chambers of the cooling jacket absorbs heat from the gases flowing through the converter, and is, therefore, warmer in each successive annular chamber than it was in the preceding chamber. The increase in the temperature of the cooling medium, of course, decreases its cooling effect. Therefore, the cooling effect is greatest where the greatest heat is generated. By proper regulation of the supply and initial temperature of the cooling medium, the heat absorbed by the cooling medium from the stream of converter gases after its contact with each catalytic mass is made slightly greater than the heat generated in that mass, so that the stream of gases has a diminishing temperature gradient, which has the desirable effect of causing rapid conversion in the initial masses and substantially complete conversion in the final masses.

What is claimed is:

1. In apparatus for the catalytic oxidation of gases, a converter having an inlet opening at its top and an outlet opening at its bottom and containing a plurality of spaced catalytic masses arranged in series, baffling means for directing the gases leaving each catalytic mass into contact with the converter shell before passing through the succeeding mass, a cooling jacket surrounding the converter and having an inlet opening at its top and an outlet opening at its bottom, means for forcing a cooling medium into the jacket through its inlet opening, and a plurality of horizontal partitions containing restricted openings located in the jacket to cause a generally downward flow of the cooling medium through the jacket.

2. In apparatus for the catalytic oxidation of gases, a converter having inlet and outlet openings at opposite ends thereof and containing a plurality of spaced catalytic masses arranged in series, baffling means for directing the gases leaving each catalytic mass into contact with the converter shell before passing through the succeeding mass, means providing a plurality of chambers surrounding said converter between its ends, and means for causing a cooling medium to flow through said chambers in series from the chamber nearest the inlet end of the converter to the chamber nearest the outlet end thereof.

In testimony whereof I have hereunto set my hand.

ALLING P. BEARDSLEY.